(12) United States Patent
Kappelhoff et al.

(10) Patent No.: US 12,429,460 B2
(45) Date of Patent: Sep. 30, 2025

(54) METHOD AND SYSTEM FOR DETECTING CHARACTERISTICS OF A SURFACE PORTION ON AN AIRCRAFT

(71) Applicant: Airbus Operations GmbH, Hamburg (DE)

(72) Inventors: Misha Kappelhoff, Jork (DE); Pia Böttcher, Constance (DE); Paul Ehrhardt, Constance (DE); Julian Sutor, Constance (DE)

(73) Assignee: Airbus Operations GmbH, Hamburg (DE)

( * ) Notice: Subject to any disclaimer, the term of this patent is extended or adjusted under 35 U.S.C. 154(b) by 297 days.

(21) Appl. No.: 18/342,298

(22) Filed: Jun. 27, 2023

(65) Prior Publication Data

US 2024/0003852 A1    Jan. 4, 2024

(30) Foreign Application Priority Data

Jun. 29, 2022   (EP) ..................................... 22182054

(51) Int. Cl.
*G01N 29/22* (2006.01)
*G01N 29/04* (2006.01)

(52) U.S. Cl.
CPC ........... *G01N 29/226* (2013.01); *G01N 29/04* (2013.01); *G01N 2291/023* (2013.01); *G01N 2291/0289* (2013.01)

(58) Field of Classification Search
None
See application file for complete search history.

(56) References Cited

U.S. PATENT DOCUMENTS

| | | | |
|---|---|---|---|
| 8,937,657 B2 | 1/2015 | Klass | |
| 2003/0128344 A1* | 7/2003 | Nishi | G03F 7/70358 356/399 |

(Continued)

FOREIGN PATENT DOCUMENTS

| | | |
|---|---|---|
| DE | 102007019764 A1 | 11/2008 |
| WO | 2009140465 A1 | 11/2009 |
| WO | 2014014786 A1 | 1/2014 |

OTHER PUBLICATIONS

European Search Report for corresponding European Patent Application No. 22182054.1 dated Dec. 5, 2022; priority document.

*Primary Examiner* — Suman K Nath
(74) *Attorney, Agent, or Firm* — Greer, Burns & Crain, Ltd.

(57) ABSTRACT

A method for detecting aircraft surface portion characteristics including applying a marking sticker with grid markings adjacent to the aircraft surface portion, simultaneously optically detecting one region of the marking sticker and one region of the surface portion via an optical detection device, removing the optical detection device, hand guiding a sensing device to a predetermined position relative to the marking sticker within the surface portion and detecting a material characteristic there, correlating the detected material characteristic with the respective position in a data set, and generating and storing a damage map in which an optically detected structure of the surface portion is combined with the additional material characteristic at the one position, wherein guiding the sensing device includes projecting a laser line outwardly from the sensing device and moving the sensing device to align the laser line with at the grid marking.

12 Claims, 3 Drawing Sheets

(56) References Cited

U.S. PATENT DOCUMENTS

| | | | |
|---|---|---|---|
| 2007/0260419 A1* | 11/2007 | Hagiwara | G03F 9/7069 |
| | | | 382/141 |
| 2009/0287427 A1 | 11/2009 | Dubois et al. | |
| 2013/0028478 A1 | 1/2013 | St-pierre et al. | |
| 2018/0180408 A1* | 6/2018 | Du | G01B 11/2545 |
| 2021/0333211 A1* | 10/2021 | Chen | G01N 15/1436 |

* cited by examiner

METHOD AND SYSTEM FOR DETECTING CHARACTERISTICS OF A SURFACE PORTION ON AN AIRCRAFT

CROSS-REFERENCES TO RELATED APPLICATIONS

This application claims the benefit of the European patent application No. 22182054.1 filed on Jun. 29, 2022, the entire disclosures of which are incorporated herein by way of reference.

FIELD OF THE INVENTION

The present description relates to a method and a system for detecting characteristics of a surface portion on an aircraft.

BACKGROUND OF THE INVENTION

For mapping damaged areas on an aircraft, a tactile method is usually used as a standard procedure, in which caliper gauges, dial gauges and the like are used. In so doing, manual measurements are taken and recorded in handwritten reports together with hand sketches.

WO 2014/014 786 A1 discloses a portable device for a 3D surface measurement technique, which generates structured light measurement patterns and projects them successively onto a target surface. Features, contours and textures of the target surface distort each projected measurement pattern image relative to the original measurement pattern. The device photographs each measurement pattern image, extracts measurement data from it based on the detected distortions, and derives a result image from selected aspects of the measurement data. The device distorts the result image in order to compensate for distortion due to the projector or surface, and projects the result image onto the measured surface, optionally with other information such as summaries, device status, menus, and instructions.

For additional information, for example a local material thickness in multiple positions of the damaged area, manual measurements are still necessary using hand-guided measuring devices which have to be placed directly on the surface and read.

SUMMARY OF THE INVENTION

In the usual damage mapping process, damaged areas are sometimes not tracked throughout the entire life of an aircraft. This means that an older damaged area, which was previously measured and found to still be OK, can be found again later and measured again, which can be time consuming overall. The correlation between the surface structure that is detected by means of a 3D method and separately detected material thicknesses is time-consuming using known means and can be imprecise.

It can be considered as an object to propose a method and/or a system for detecting characteristics of a surface portion, in which a precise correlation of surface structures and additional measurement data is rendered possible with little effort.

A method is proposed for detecting characteristics of a surface portion on an aircraft, comprising the steps of applying a marking element with a plurality of grid markings adjacent to a surface portion to the aircraft, simultaneously optically detecting at least one region of the marking element and at least one region of the surface portion by means of an optical detection device, removing the optical detection device, guiding a hand-guided sensing device one or more times to a predetermined position relative to the marking element within the surface portion and detecting a material characteristic there, correlating the detected material characteristic with the respective position in a data set, and generating and storing a damage map in which an optically detected structure of the surface portion is combined with the additional material characteristic at at least one position, wherein guiding the sensing device comprises projecting at least one laser line outwardly from the sensing device and moving the sensing device to align the at least one laser line with at least one of the grid markings.

The surface portion to be examined can be a portion of a body of the aircraft that forms a surface. In particular, the surface portion can have a planar extension that is formed, for example, by a planar component. The planar component could comprise an outer skin or be a part thereof. The area can have a surface structure that is to be optically examined, wherein additional material characteristics are detected by the method according to the invention. For example, the surface portion comprises a damaged area, which could be optically detectable by a changed surface structure. A suitable additional material characteristic to be detected is, for example, a material thickness of the surface portion or of a flat component that forms the surface portion.

The marking element is used so as to define a local coordinate system on the surface portion, which is later used to combine measurement results from different sources. The marking element can be realized in the form of a sticker, a flat magnetic body or by other elements that can be fixedly attached at least temporarily to the surface in question. It is also conceivable to realize a marking element by a projection of light signals during the process.

The marking element comprises, on its side facing away from the surface receiving it, at least one and preferably a plurality of grid markings which are preferably optically detectable. It is not initially significant what shape the marking element has in order to perform its basic function. The marking element can be placed as desired and fundamentally oriented as desired. The aim is to perform an optical detection of the surface portion with the marking element arranged directly adjacent to it in order to subsequently align the sensing device relative to the marking element or the grid markings that are arranged thereon separately from the optical detection device.

The optical detection device can be a facility that is embodied in the aforementioned publication WO 2014/014 786 A1. In particular, it is configured so as to determine a surface structure of the surface portion by optical methods, wherein the position of the surface portion is also detected by the marking element during this determination process. The measurement data that is supplied from the optical detection device can be transferred to a damage map in which the local coordinates can be described by means of the coordinate system that is defined by the marking element. The optical detection forms a first process in the method according to the invention. It can correspond to that of a conventional process for detecting a surface structure, as described in WO 2014/014 786 A1.

After the surface portion and the marking element have been equally detected using the optical detection device and the damaged area has been optically detected, the optical detection device can be removed. It is then readily possible to perform additional measurements on the surface portion, the positions of which are then also measured relative to the marking element. This forms the second process of the method. For precise positioning of the sensing device in the local coordinate system, the sensing device comprises a corresponding laser unit which is configured so as to emit at least one laser line outwardly in order to align the at least one laser line with grid markings.

It is conceivable that the sensing device has a contact surface which is to be placed on the surface to be inspected. Furthermore, it is conceivable that the sensing device comprises an input unit in the form of a probe or the like. After a positioning and a corresponding input, in other words an actuation of the probe, a local measurement can be performed. The at least one laser line is emitted by the sensing device in a specific, fixed direction outwardly and brought into alignment with at least one of the grid markings. Since the orientation of the laser line with respect to the sensing device is fixed and the relative position of the marking element to the surface portion is known after optical detection, all subsequently measured material characteristics can be correlated with discrete positions of the surface portion and stored in the damage map.

For this purpose, the sensing device could be coupled to a computing unit, for example, in order to send the measurement result to the computing unit after each measurement has been performed. An image from the optical detection device could be available in the computing unit. The respective measurement result is added to a corresponding coordinate in the damage map. The method according to the invention thus renders it possible to very conveniently combine different types of measurements in an automated and precise manner.

In an advantageous embodiment, the marking element comprises two arms that are arranged at right angles to one another, each of which has grid markings. The two arms of the marking element can thereby span a local coordinate system that is associated with the damaged area. Both arms could have the same or different grid markings, which act as coordinate tuples. The sensing device can be placed at different positions in the damaged area, which can be clearly detected by the local coordinate system. This enables an unambiguous and precise relationship between the location of the sensing device and the position in the local coordinate system.

In an advantageous embodiment, the sensing device is guided multiple times on a matrix-like arrangement of positions. This renders it possible for the area of the surface portion to be gradually scanned using the sensing device. It is conceivable to consider only a part of the area. For example, after optical detection of the surface portion, a region could be identified that has more significant damage. This region could be specifically examined by means of the sensing device. The sensing device could successively examine different positions of the matrix-like arrangement in that it is successively placed at specific positions in order to be placed at a next position after a measurement has been performed.

In an advantageous embodiment, the marking element and the surface portion are completely detected by means of the optical detection device in one or more detection processes. If the surface portion is relatively large, the detection range of the optical detection device might not be sufficient to render possible a complete imaging of the surface portion. By using the marking element, which preferably has an area extent that is adapted to the size of the surface portion, the surface portion can also be detected in multiple steps. In each of the steps, a partial region of the surface portion can be captured with a partial region of the marking element. The individual partial images are combined into an overall image based on the respective captured parts of the marking element. Each individual, subsequent measurement process using the sensing device then renders it possible for the measurements to be correlated with the overall image in a damage map.

In an advantageous embodiment, the sensing device projects cross lines. For this purpose, the sensing device comprises a cross line laser unit that emits two laser lines that run at right angles to one another. This renders it possible for two grid markings that are located on two arms of the marking element to be targeted simultaneously, so that the respective position of the sensing device is precisely detected. It is convenient to align the sensing device in such a manner that it has a predetermined orientation relative to the local coordinate system. In this manner, it is possible in a particularly advantageous manner to scan flat regions gradually with individual measurements of material characteristics and to transfer them to the damage map.

In an advantageous embodiment, the sensing device is moved successively on the positions of the matrix-like arrangement in such a manner that thereby the cross lines correlate with multiple pairs of grid markings of the two arms of the marking element. The moving process can be performed manually, wherein the corresponding user visually checks the position of the sensing device with the aid of the marking element and adjusts it accordingly.

In a further advantageous embodiment, the predetermined position is communicated in each case by a visual, acoustic or haptic signal, wherein the detection process is initiated by actuating an input unit after the sensing device has been guided. The computing unit could, for example, have a display unit that indicates to a user a position to be assumed. The user can then place the sensing device on the indicated position and perform a measurement there. The measurement can be transmitted to the computing unit, which then assumes that the previously displayed position was assumed by the sensing device and that the transmitted measurement value belongs to this position. Thus, a series of individual measurements can be correlated fully automatically with positions within the damaged area.

The invention further relates to a system for detecting characteristics of a surface portion on an aircraft, comprising at least one marking element with a plurality of grid markings for application adjacent to a surface portion on the aircraft, a hand-guided sensing device, and a computing unit, wherein the computing unit is configured so as to receive surface structure data from an optical detection device that is configured so as to optically scan a structure of the surface portion together with the marking element, wherein the sensing device is configured so as to detect a local material characteristic on the surface portion, wherein the sensing device is configured so as to emit at least one laser line outwardly in order to guide a user to move the sensing device so as to align the at least one laser line with at least one of the grid markings of the marking element that is adhered adjacent to the surface portion, wherein the computing unit is configured so as to correlate the detected material characteristic with the respective position in a data set, and wherein the computing unit is configured so as to generate and store a damage map in which an optically detected structure of the surface portion is combined with the additional material characteristic at at least one position. The computing unit can contain software that is suitable for recording and processing structural data in the sense of the aforementioned method.

In an advantageous embodiment, the marking element comprises two arms that are arranged at right angles to one another, each having grid markings.

In an advantageous embodiment, the sensing device is configured so as to project cross lines. This renders it possible for the position of the sensing device to be adjusted and checked, as explained previously.

In an advantageous embodiment, the sensing device has a contact surface which is to be placed on the surface portion in order to detect the material characteristic, wherein the sensing device is configured so as to project the at least one laser line parallel to the contact surface.

In an advantageous embodiment, the sensing device comprises an ultrasound measuring head. This could be provided for testing a material thickness.

BRIEF DESCRIPTION OF THE DRAWINGS

In the following, exemplary embodiments are described in more detail with reference to the accompanying drawings. The illustrations are schematic and not to scale. Identical reference signs refer to identical or similar elements. In the drawing.

DETAILED DESCRIPTION OF THE PREFERRED EMBODIMENTS

Figure 1:
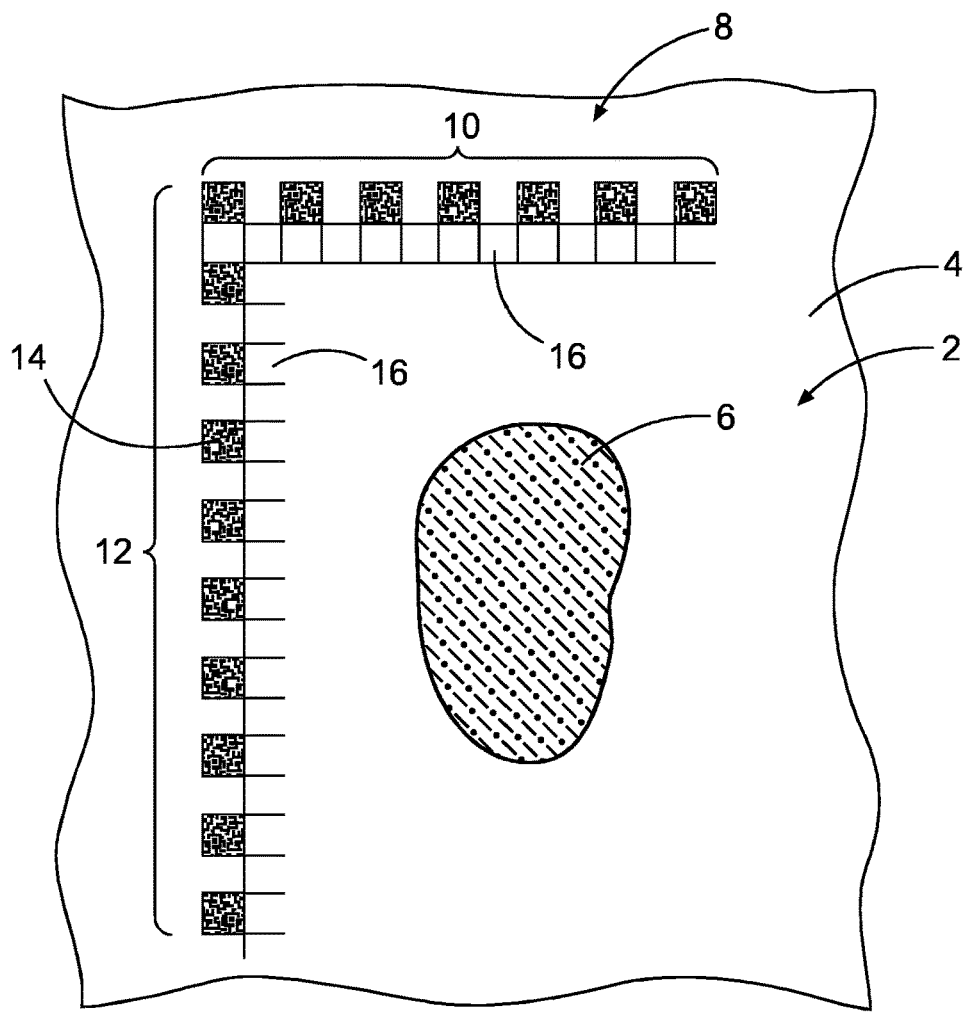
FIG. 1 shows a schematic representation of a surface with surface portion and marking element.

FIG. 1 shows a section of a surface 2 of an aircraft fuselage 4 on which a damaged area 6 is present as a surface portion to be examined. So as to detect characteristics of the damaged area 6, a method is proposed which runs in multiple stages and combines optically detected topography information with measurement results from other sensors.

First of all, a marking element 8 is adhered adjacent to the damaged area 6. In this embodiment, the marking element 8 is L-shaped and comprises two arms 10 and 12 which are arranged perpendicular to one another. These define a local coordinate system, which is arranged directly adjacent to the damaged area 6. The first arm 10 represents a first axis and the second arm 12 a second axis. Due to their rectangular arrangement, the coordinate system is Cartesian. It is used as a basis for a damage map that is to be generated. It is conceivable that the marking element 8 is preferably adhered to an aircraft-fixed coordinate system in such a manner that at least one of the two arms 10 and 12 is parallel to one of the main axes of the aircraft-fixed coordinate system.

The two arms 10 and 12 each have first grid markings 14, which are exemplified here as QR codes. These are easily digitally detectable, and could represent letters and/or numbers, for example. Second grid markings 16 are provided on the arms 10 and 12, which can be read by humans and have letters (first arm 10) or numbers (second arm 12). By reading the first or second grid markings 16 on both arms 10 and 12, each position on the damaged area 6 can be assigned to the local coordinate system.

Figure 2:
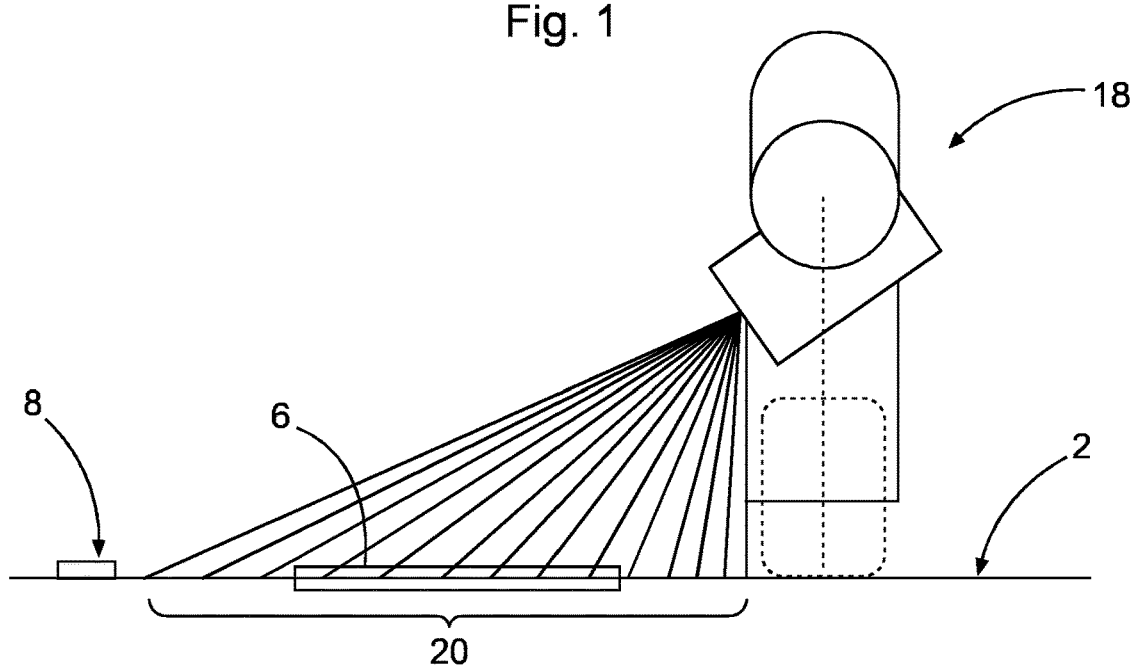
FIG. 2 shows a schematic representation of an optical detection device that detects a surface structure of the surface.

FIG. 2 schematically shows an optical detection device 18, which is placed on the surface 2 in order to project structured light measurement patterns 20 onto the surface 2 and thus also onto the damaged area 6. The light measurement patterns 20 are distorted with respect to the original measurement patterns 20 due to the characteristic properties of the surface 2 at the damaged area 6. As each light measurement pattern 20 is projected, the detection device 18 photographs the surface 2 and can deduce a surface structure of the damaged area 6 from the distortions that are detectable in the image. Moreover, by photographing the surface 2, the marking element 8 is also detected, so that the topography of the damaged area 6 is always present in the local coordinate system that is defined by the marking element 8. After this first process of the method has been carried out, the detection device 18 is removed from the surface 2. The marking element 8 remains on the surface 2 for a subsequent process in which further material characteristics are recorded.

Figure 3:
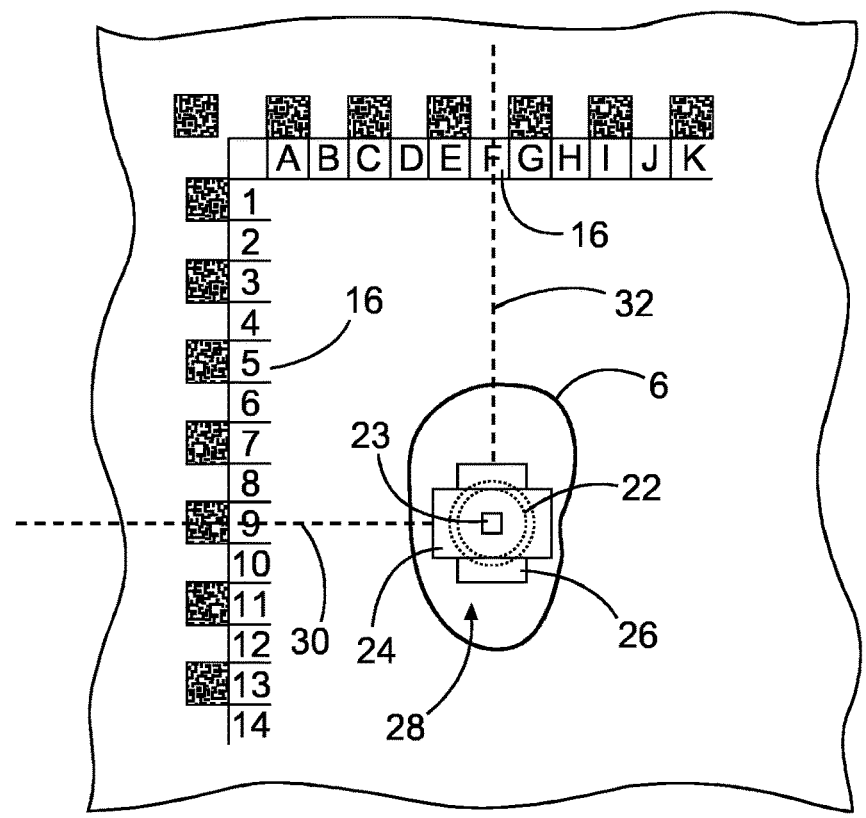
FIG. 3 shows a schematic representation of a sensing device on the surface portion.

FIG. 3 shows the damaged area 6, on which a sensing device 22 is arranged. The sensing device 22 could, for example, have an ultrasound measuring head that is configured so as to determine a material thickness of the fuselage 4 at the local position of the sensing device 22. An input unit 23 in the form of a probe can perform an initiation of a measuring process. The sensing device 22 preferably comprises a communication unit, either wired or preferably wireless, with which a measurement result is transmitted to a computing unit, not illustrated here.

The sensing device 22 further comprises a first line laser unit 24 and a second line laser unit 26, which together form a cross line laser unit 28 and are fixedly arranged on the sensing device 22. The first line laser unit 24 is configured so as to emit first horizontal laser lines 30 in the drawing plane in FIG. 3, while the second laser unit 26 is configured so as to emit second laser lines 32 in a direction perpendicular thereto. The laser lines 30 and 32 can be aligned with the marking elements 16 of the first arm 10 and the second arm 12, so that a user can directly read therefrom the position of the sensing device 22 within the local coordinate system or place the sensing device 22 at a desired position. In FIG. 3, the first laser line 30 is aligned with the second grid marking "9" of the second arm 10, while the second laser line 32 is aligned with the second grid marking "F" of the first arm 10. Consequently, the position of the sensing device 22 is then to be designated "F9". This position is known in the image of the damaged area 6 from the optical detection device 18.

A user can take measurements at multiple positions of the damaged area 6 and pass them on to a computing unit in the local coordinate system. Thus, a correlation between the surface structure of the damaged area 6 and the further material characteristics that are detected by the sensing device 22 can be performed automatically.

Figure 4:
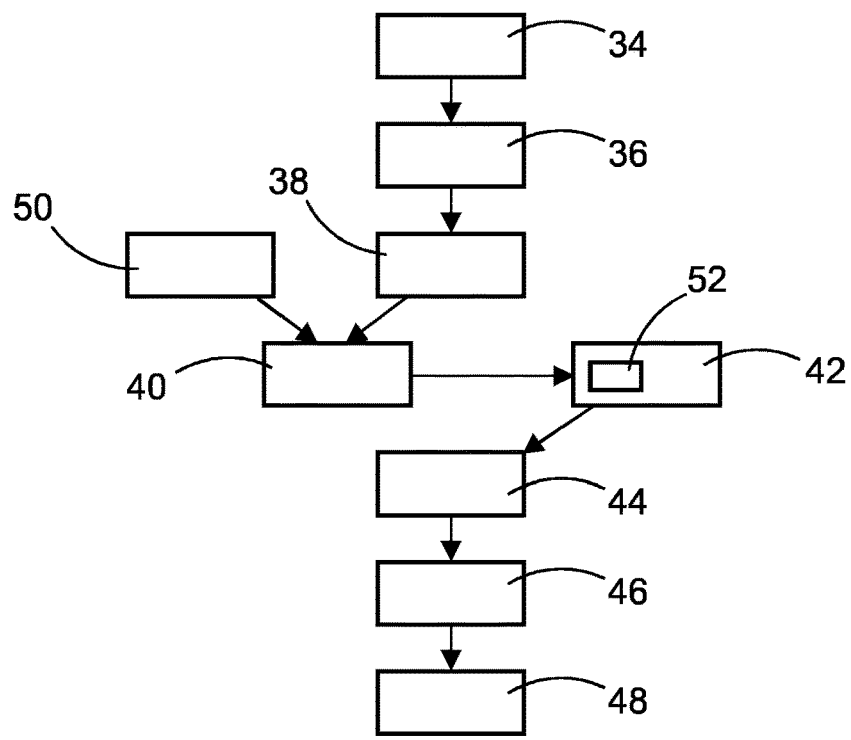
FIG. 4 shows a schematic representation of a method.

The method is further illustrated in FIG. 4. It starts with the step of applying 34 the marking element 8 with a plurality of grid markings 14, 16 adjacent to the surface portion 6, for example a damaged area, to the aircraft. This is followed by simultaneous optical detection 36 of at least one region of the marking element 8 and at least one region of the surface portion 6 by means of the optical detection device 18, after which the optical detection device 18 is removed again 38. The marking element 8 remains on the surface 2. In a further subsequent step, the hand-guided sensing device 22 is guided 40 one or more times to a predetermined position relative to the marking element 8 within the surface portion 6 and a material characteristic is detected 42 there. The material characteristics thus detected are correlated 44 with the respective position in a data set and subsequently a damage map is generated 46 and stored 48, in which an optically detected structure of the surface portion 6 is combined with the additional material characteristic at at least one position. As previously explained, guiding the sensing device 22 thereby comprises projecting at least one laser line 30, 32 outwardly from the sensing device 22 and moving the sensing device 22 to align the at least one laser line 30, 32 with at least one of the grid markings 14, 16. The respective positions to which the sensing device 22 is to be guided 40 could be communicated to a user by emitting 50 a visual, audible or haptic signal. The user can initiate the detection process 42 by actuating 52 an input unit after the sensing device 22 has been guided 40.

Figure 5:
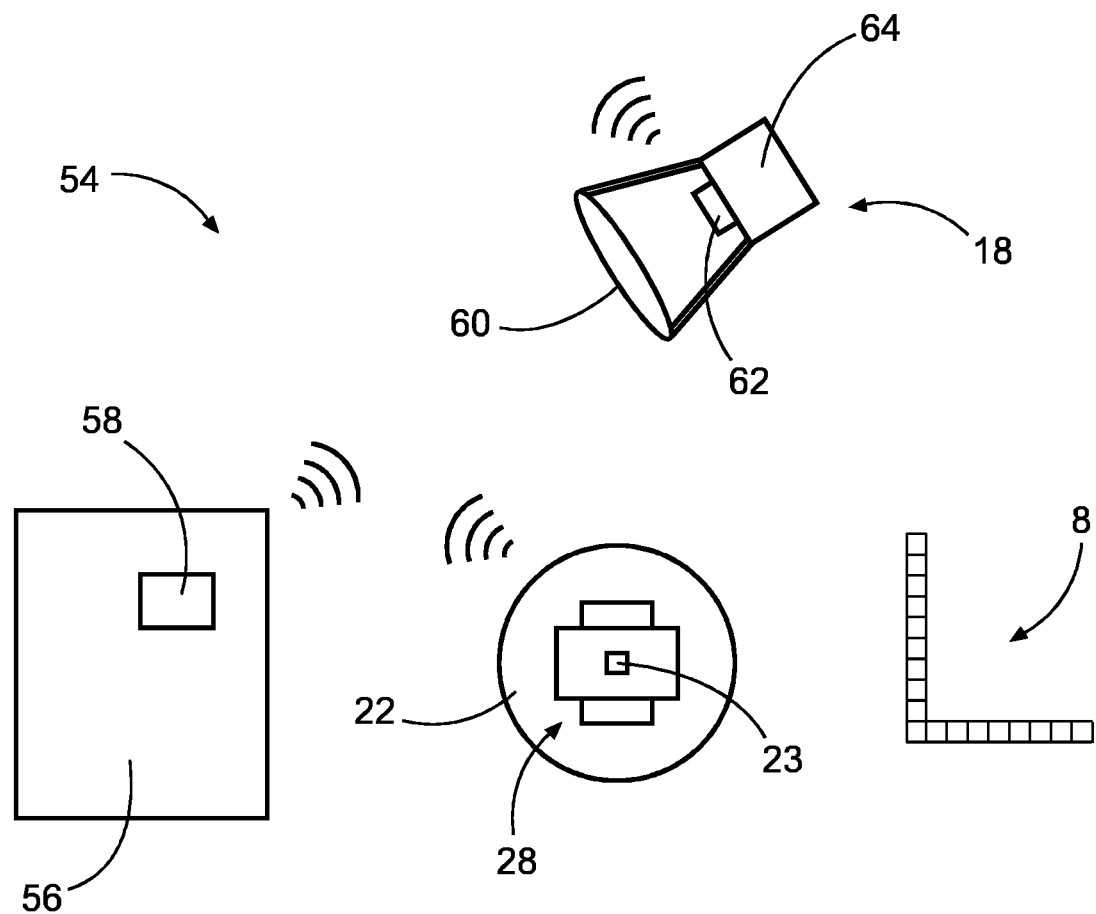
FIG. 5 shows a schematic representation of a system.

FIG. 5 shows a system 54 for detecting characteristics of a surface portion 6, for example a damaged area, and comprises the marking element 8 with a plurality of grid markings 14, 16 for application adjacent to the surface portion 6 on the aircraft, the hand-guided sensing device 22 and a computing unit 56.

The computing unit 56 is configured so as to receive surface texture data from the optical detection device 18, which is schematically illustrated here and comprises, in addition to an optic 62, a processing unit 64 and a support frame 60 for placing the detection device 18 on the surface 2 so as to maintain a predetermined distance of the optics 62 from the surface 2. The optical detection device 18 is not necessarily part of the system 54, but can be used separately for use of the method according to the invention in different variants. It is configured so as to optically scan a structure of the surface portion 6 together with the marking element 8 and to provide structural data in the process. This can be transmitted to the computing unit 56 for processing.

The sensing device 22, however, is configured so as to detect a local material characteristic, for example the thickness, on the surface portion 6, wherein a user places the sensing device 22 guided by the cross line laser unit 28 relative to the marking element 8. A measurement can be initiated by actuating the input unit 23, which is arranged, for example, on the side of the sensing device 22 that is facing away from the surface 2.

The computing unit 56 is configured so as to correlate the detected material characteristic with the relevant position in a data set and, in doing so, to generate and store a damage map with the previously detected structural data. The material characteristics are then unambiguously and precisely correlated with the structural data. For this purpose, the computing unit 56 can contain suitable software 58 that is suitable for recording and processing structural data in the sense of the aforementioned method and detected material characteristics.

For example, the damage map could be a type of heat map in which local height deviations of the surface 2 are displayed, which are colored accordingly as a function of local material thicknesses, wherein "hotter" colors, in other words colors that change to red, can represent lower material thicknesses or material thicknesses that are too low.

The systems and devices described herein may include a controller, control unit, controlling means, system control or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS

2 Surface
4 Aircraft fuselage

6 Surface portion, for example damaged area
8 Marking sticker
10 First arm
12 Second arm
14 First grid markings
16 Second grid markings
18 Optical detection device
20 Light measurement pattern
22 Sensing device
23 Input unit
24 First line laser unit
26 Second line laser unit
28 Cross line laser unit
30 First laser line
32 Second laser line
34 Attaching marking stickers
36 Optical detection
38 Removing optical detection device
40 Guiding the sensing device one or more times
42 Detecting of a material characteristic
44 Correlating with position
46 Generating damage map
48 Storing damage map
50 Outputting signal
52 Actuating input unit
54 System
56 Computing unit
58 Software
60 Contact frame

The invention claimed is:

1. A method for detecting characteristics of a surface portion on an aircraft, comprising the steps:
applying a marking element with a plurality of grid markings adjacent to the surface portion of the aircraft,
simultaneously optically detecting at least one region of the marking element and at least one region of the surface portion by means of an optical detection device,
removing the optical detection device,
guiding a hand-guided sensing device one or more times to a predetermined position relative to the marking element within the surface portion and detecting a material characteristic there,
correlating the detected material characteristic with the respective position in a data set, and
generating and storing a damage map in which an optically detected structure of the surface portion is combined with the additional material characteristic at at least one position,
wherein guiding the sensing device comprises projecting at least one laser line outwardly from the sensing device and moving the sensing device so as to align the at least one laser line with at least one of the grid markings.

2. The method as claimed in claim 1, wherein the marking element comprises two arms that are arranged at right angles to one another, each of which has grid markings.

3. The method as claimed in claim 1, wherein the sensing device is guided multiple times on a matrix-like arrangement of positions.

4. The method as claimed in claim 1, wherein the marking element and the surface portion are fully detected by means of the optical detection device in one or more detection processes.

5. The method as claimed in claim 1, wherein the sensing device projects cross lines.

6. The method as claimed in claim 5,
wherein the marking element comprises two arms that are arranged at right angles to one another, each of which has grid markings,
wherein the sensing device is guided multiple times on a matrix-like arrangement of positions, and
wherein the sensing device is moved successively on the positions of the matrix-like arrangement in such a manner that thereby the cross lines correlate with multiple pairs of grid markings of the two arms of the marking element.

7. The method as claimed in claim 1,
wherein the predetermined position is communicated in each case by a visual, acoustic or haptic signal, and
wherein the detection process is initiated by actuating an input unit after the sensing device has been guided.

8. A system for detecting characteristics of a surface portion on an aircraft, comprising:
at least one marking element with a plurality of grid markings for applying adjacent to a surface portion to the aircraft,
a hand-guided sensing device, and
a computing unit,
wherein the computing unit is configured to receive surface structure data from an optical detection device that is configured to optically scan a structure of the surface portion together with the marking element,
wherein the sensing device is configured to detect a local material characteristic on the surface portion,
wherein the sensing device is configured to emit at least one laser line outwardly to guide a user to move the sensing device to align the at least one laser line with at least one of the grid markings of the marking element that is applied adjacent to the surface portion,
wherein the computing unit is configured to correlate the detected material characteristic with the respective position in a data set, and
wherein the computing unit is configured to generate and store a damage map in which an optically detected structure of the surface portion is combined with the detected material characteristic at at least one position.

9. The system as claimed in claim 8, wherein the marking element has two arms that are arranged at right angles to one another, each of which has grid markings.

10. The system as claimed in claim 8, wherein the sensing device is configured so as to project cross lines.

11. The system as claimed in claim 8,
wherein the sensing device has a contact surface which is to be placed on the surface portion in order to detect the material characteristic, and
wherein the sensing device is configured so as to project the at least one laser line parallel to the contact surface.

12. The system as claimed in claim 8, wherein the sensing device has an ultrasound measuring head.

* * * * *